US009870366B1

United States Patent
Duan et al.

(10) Patent No.: US 9,870,366 B1
(45) Date of Patent: Jan. 16, 2018

(54) PROCESSING STORAGE CAPACITY EVENTS IN CONNECTION WITH FILE SYSTEMS

(71) Applicant: EMC IP Holding Company LLC, Hopkinton, MA (US)

(72) Inventors: Seven Wei Duan, Chengdu (CN); Denny Dengyu Wang, Beijing (CN); Tony Fuchuan Xu, Chengdu (CN); Lester Ming Zhang, Beijing (CN); Umer Najem Toor, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 14/858,376

(22) Filed: Sep. 18, 2015

(51) Int. Cl.
  *G06F 12/00* (2006.01)
  *G06F 17/30* (2006.01)
  *G06F 3/06* (2006.01)

(52) U.S. Cl.
  CPC ...... *G06F 17/30144* (2013.01); *G06F 3/0608* (2013.01); *G06F 3/0653* (2013.01); *G06F 3/0689* (2013.01)

(58) Field of Classification Search
  None
  See application file for complete search history.

(56) References Cited

U.S. PATENT DOCUMENTS

| 2005/0193173 | A1* | 9/2005 | Ring | G06F 21/57 711/118 |
| 2009/0100163 | A1* | 4/2009 | Tsao | H04L 41/12 709/223 |
| 2010/0057989 | A1* | 3/2010 | Sakashita | G06F 3/0617 711/114 |
| 2016/0231946 | A1* | 8/2016 | Gensler, Jr. | G06F 3/0665 |
| 2017/0075605 | A1* | 3/2017 | Sundarrajan | G06F 3/065 |

OTHER PUBLICATIONS

EMC, "Virtual Provisioning for the EMC VNX2 Series VNX5200, VNX5400, VNX5600, VNX5800, VNX7600, & VNX8000 Applied Technology," White Paper, Aug. 2015.
Global Services Notification of Product Release: VNX OE for Block 05.33.008.5.119 and VNX OE for File 8.1.8.119, dated Aug. 10, 2015, EMC Corporation.
Software release for VNX OE for Block 05.33.008.5.119 and VNX OE for File 8.1.8.119, Aug. 10, 2015.

* cited by examiner

*Primary Examiner* — John A Lane
(74) *Attorney, Agent, or Firm* — Muirhead and Saturnelli, LLC

(57) ABSTRACT

Described are techniques for processing capacity-related event occurrence. A first occurrence is determined for of any of a low threshold event and an out of space event for a first storage pool. A set of one or more virtually provisioned logical devices has physical storage provisioned from the first storage pool and physical storage for a file system is provisioned from the set of one or more virtually provisioned logical devices. First processing is performed responsive to determining the first occurrence of any of the low threshold event and the out of space event for the first storage pool. The first processing includes performing processing to that protects the file system.

16 Claims, 15 Drawing Sheets

FIG. 7D

PROCESSING STORAGE CAPACITY EVENTS IN CONNECTION WITH FILE SYSTEMS

BACKGROUND

Technical Field

This application generally relates to data storage and processing capacity-related events.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of processing capacity-related event occurrences comprising: determining a first occurrence of any of a low threshold event and an out of space event for a first storage pool, wherein a set of one or more virtually provisioned logical devices has physical storage provisioned from the first storage pool and physical storage for a file system is provisioned from the set of one or more virtually provisioned logical devices; and performing first processing responsive to determining the first occurrence of any of the low threshold event and the out of space event for the first storage pool, the first processing including performing processing that protects the file system. The first occurrence may denote an occurrence of the low space event for the first storage pool. The first processing may include performing processing to handle the first occurrence of the low space event for the first storage pool, the first processing including remounting the file system as read only. The first processing may include generating an alert regarding the low space event for the first storage pool. The first processing may include suspending any replication sessions involving the file system. The first processing may include increasing free capacity of the first storage pool; determining whether current free capacity of the first storage pool is greater than the threshold; if it is determined that the current free capacity of the first storage pool is not greater than the threshold, performing processing to further increase the current free capacity of the first storage pool; and if it is determined that the current free capacity of the first storage pool is greater than the threshold, clearing the low space event for the first storage pool. The method may also include performing additional processing once the low space event for the first storage pool is cleared. The additional processing may include restoring the file system to its original state prior to the remounting of the file system as read-only. The first occurrence may denote an occurrence of the out of space event for the first storage pool. The first processing may include performing processing to handle the first occurrence of the out of space event for the first storage pool, the first processing including unmounting the file system. Another occurrence may denote an occurrence of the low space event that occurs prior to the first occurrence and the first processing may include generating an alert regarding the first occurrence of the out of space event for the first storage pool. The first processing may include suspending any replication sessions involving the file system. The first processing may include increasing free capacity of the first storage pool; determining whether current free capacity of the first storage pool is greater than the threshold; if it is determined that the current free capacity of the first storage pool is not greater than the threshold, performing processing to further increase the current free capacity of the first storage pool; and if it is determined that the current free capacity of the first storage pool is greater than the threshold, clearing the low space event for the first storage pool. The method may also include performing additional processing once the low space event for the first storage pool is cleared, and the additional processing may include restoring the file system to its original state prior to the unmounting of the file system. A threshold may be defined for the first storage pool denoting an amount of free storage for the first storage pool and wherein there may be an occurrence of the low threshold event when free capacity of the first storage pool is less than the threshold. There may be an occurrence of the out of space event when free capacity of the first storage pool reaches zero. A second set of one or more other logical devices may have storage provisioned from the first storage pool, and the method may include receiving an I/O operation directed to a first logical device in the second set, said I/O operation being a block-based I/O operation to perform any of read and write to a location on the first logical device. The first logical device may be a virtually provisioned logical storage device.

In accordance with another aspect of the invention is a system comprising: a processor; and a memory comprising code stored therein that, when executed, performs a method of processing capacity-related event occurrences comprising: determining a first occurrence of any of a low threshold event and an out of space event for a first storage pool, wherein a set of one or more virtually provisioned logical devices has physical storage provisioned from the first storage pool and physical storage for a file system is provisioned from the set of one or more virtually provisioned logical devices; and performing first processing responsive to determining the first occurrence of any of the low threshold event and the out of space event for the first storage pool, the first processing including performing processing that protects the file system.

In accordance with another aspect of the invention is a computer readable medium comprising code stored thereon that, when executed, performs method of processing capacity-related event occurrences comprising: determining a first occurrence of any of a low threshold event and an out of space event for a first storage pool, wherein a set of one or more virtually provisioned logical devices has physical storage provisioned from the first storage pool and physical storage for a file system is provisioned from the set of one or more virtually provisioned logical devices; and performing first processing responsive to determining the first occurrence of any of the low threshold event and the out of space event for the first storage pool, the first processing includes performing processing that protects the file system. The first occurrence may denote an occurrence of the low space event for the first storage pool. The first processing may include performing processing to handle the first occurrence of the low space event for the first storage pool. The first processing may include remounting the file system as read only.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6A, 6B, 7A, 7B, 7C and 7D are examples of graphical user interface displays that may be used in an embodiment in accordance with techniques herein.

DETAILED DESCRIPTION OF EMBODIMENT(S)

Figure 1:
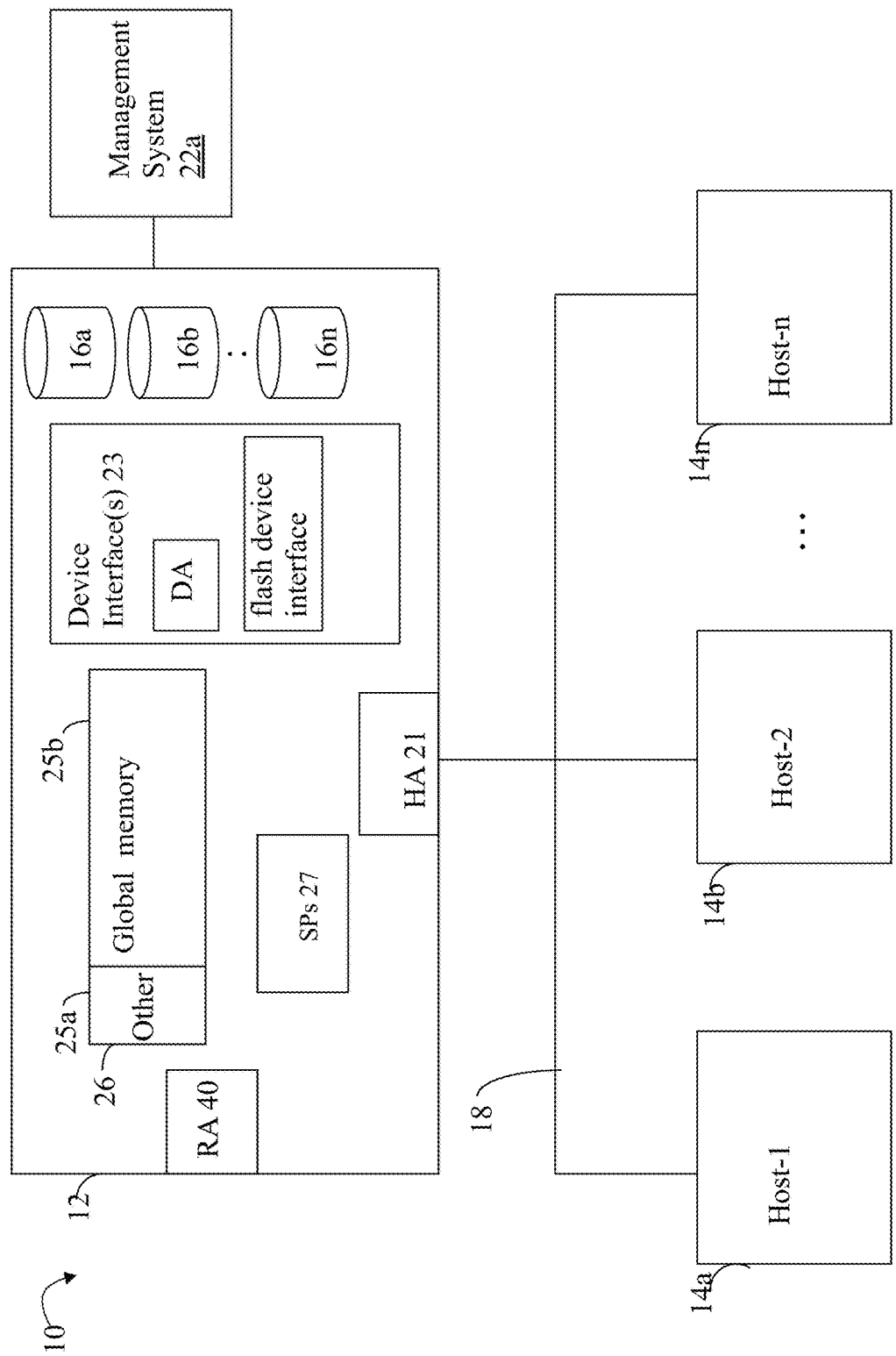
FIGS. 1, 4, 5 are examples of components that may be included in systems in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Figure 2:
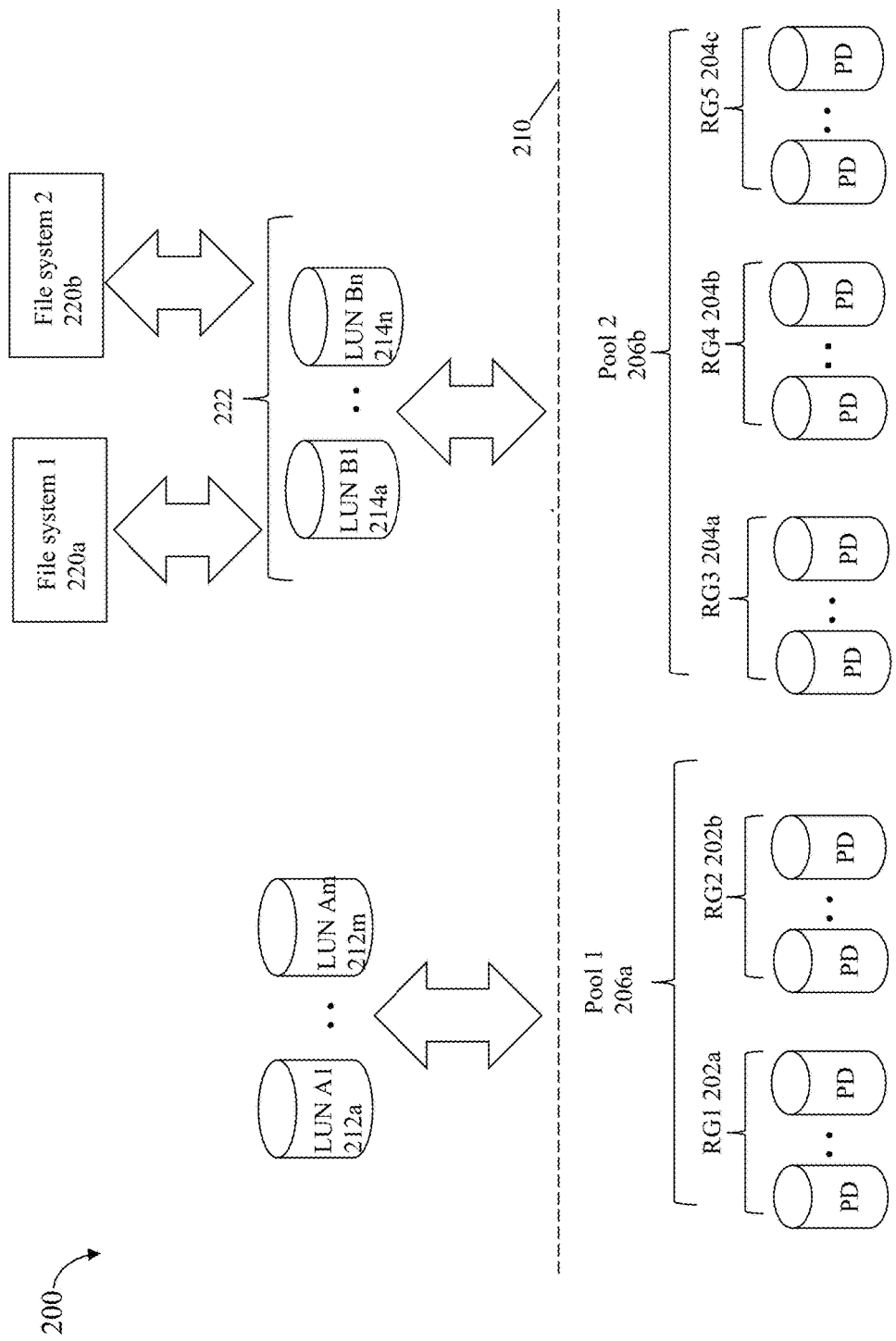
FIG. 2 is an example illustrating physical and logical views of entities in connection with storage in an embodiment in accordance with techniques herein.

In a data storage system in an embodiment in accordance with techniques herein, PDs may be configured into a pool or group of devices where the data storage system may include many such pools of PDs such as illustrated in FIG. 2. Each pool may include one or more configured RAID (Redundant Array of Independent Disks) groups of PDs. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group.

A data storage system may perform many different data services. For example, an embodiment in accordance with techniques herein may provide one or more replication services. It should be noted that replication services and techniques are known in the art and may generally be characterized as a data service performed to copy or replicate storage, such as replicate a file system, LUN, and the like. Replication may be local or within the same data storage system. For example, replication may be performed to make a copy of a LUN or file system. Replication may also be remote, for example, where processing is performed to make and keep an update to date copy of a LUN, file system, and the like, where the original is on a first data storage system and the copy is on a second remote data storage system. It should also be noted that generally, replication techniques may make a logical copy of an original set of data or may make a bit-for-bit physical copy/duplicate of the original. For example, a snapshot of a LUN may be a known technique for making a logical copy of a LUN. Such logical copies may rely on the existence of the original or a base data set and the logical copies whereby destruction or loss of the original or base data set also causes data loss or unavailability of the logical copy. In contrast, a physical bit for bit copy is a complete duplication of the original data set where the physical copy may be used independently of the original.

Depending on the particular embodiment, each pool may also include PDs of the same type or technology, or may alternatively include PDs of different types or technologies. For example, with reference to FIG. 2, a first pool, pool 1 2016a, may include a first RAID group (RG) of 10K RPM rotating disk drives (denoted as RG1 202a) and also include a second RG of flash-based drives (denoted as RG2 202b). A second pool, pool 2 206b, may include 3 RGs (denoted RG3 204a, RG 4 204b and RG 5 204c) each of which includes only flash-based drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-b and RGs 202a-b, 204a-c of the physical view of storage may be further configured into one or more logical entities, such as LUNs or logical devices. For example, LUNs 212a-m may be configured from pool 1 206a and LUNs 214a-n may be configured from pool 206b.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. Thus, at any point in time, not all portions of the logical address space of a virtually provisioned device may be associated or mapped to allocated physical storage depending on which logical addresses of the virtually provisioned LUN have been written to at a point in time.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

It should be noted that the total usable capacity denoting a total logical capacity of LUNs (where at least one of the LUNs is a thin LUN) configured from a pool may exceed the physical capacity of the underlying PDs. For example, the total usable capacity denoting the total logical capacity of LUNs 212a-m, which includes at least one thin LUN, may exceed the amount of physical storage capacity of PDs of the pool 1 206a. Similarly, the total usable capacity denoting the total logical capacity of LUNs 214a-n, which includes at least one thin LUN, may exceed the amount of physical storage capacity of PDs of the pool 2 206b. The amount by which the total logical capacity or total usable capacity of all LUNs in a specified set exceeds the physical storage capacity, such as of a pool, may be referred to as an oversubscribed capacity.

LUNs configured from a pool may be further mapped to one or more other logical entities. For example, referring again to FIG. 2, group 222 of LUNs 214a-n may be configured as thin or virtually provisioned LUNs which are used to provide physical storage for file systems, such as file system 1 220a and file system 2 220b. The file systems 220a-b may be any suitable file system known in the art such as an NFS (Network File System) file system or a CIFS (Common Internet File System) file system.

In a data storage system using thin or virtually provisioned LUNs, such thin LUNs 214a-n may present to the file systems 220a-b a large total usable capacity when such thin LUNs may not be fully backed by physical storage equal to the total usable capacity. Thus, clients and applications using the file systems 220a-b are presented with a virtual maximum size of the file systems 220a-b of which only a portion may be physically allocated for the associated LUNs 222 providing the backing storage for the file systems 220a-b. In a similar manner, the file systems 220a-b may be presented with LUNs 222 having a large total usable or logical capacity when in fact the underlying LUNs 222 may not be fully backed by physical storage.

Figure 3:
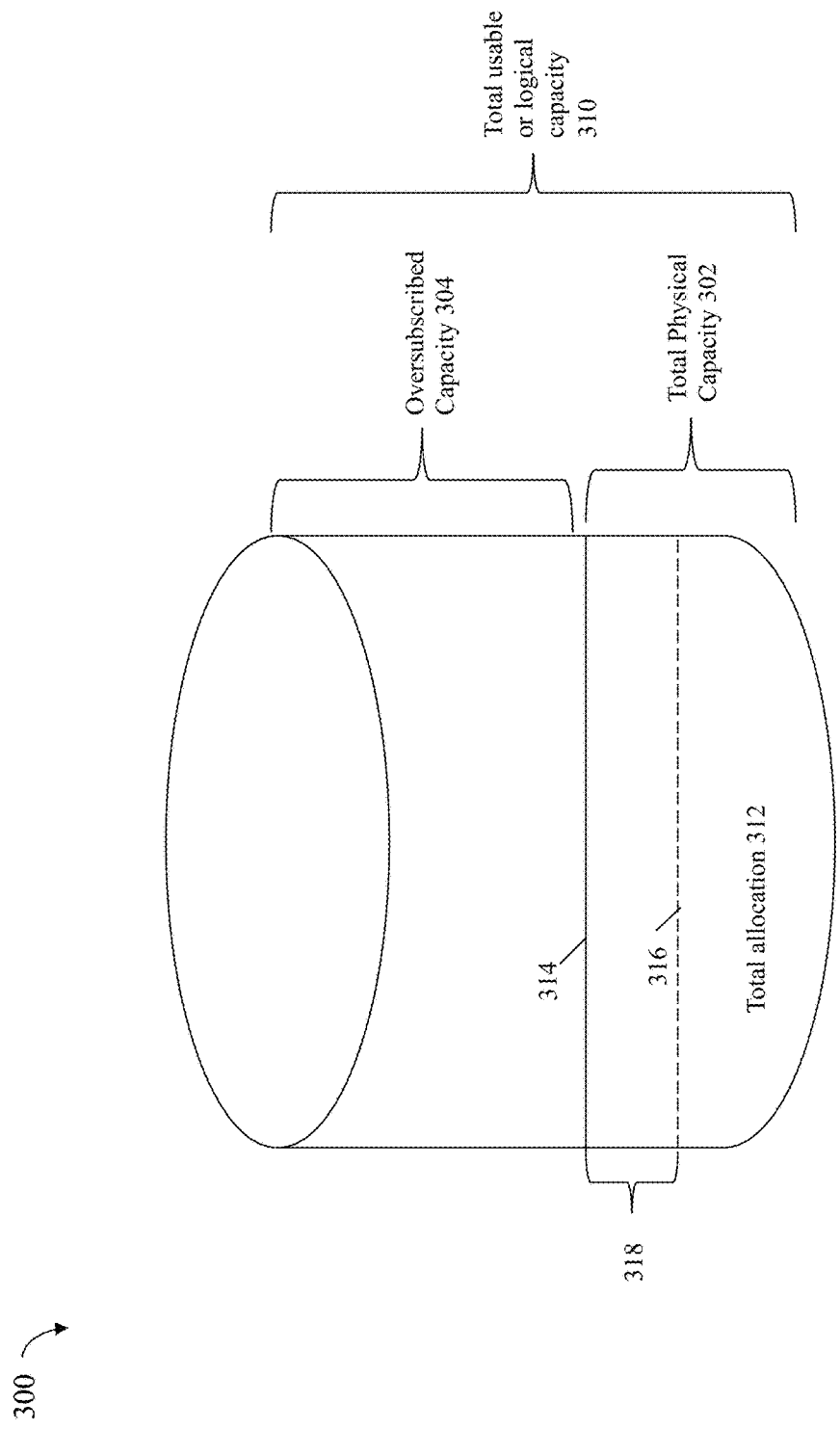
FIG. 3 is an example illustrating oversubscription such as in connection with thin or virtually provisioned devices in an embodiment in accordance with techniques herein.

Referring to FIG. 3, shown is an example 300 illustrating oversubscription in connection with a pool from which thin LUNs are configured in an embodiment in accordance with techniques herein. The example 300 illustrates the total usable or logical capacity 310 collectively denoting the sum or aggregate usable or logical capacity of all LUNs configured from a pool. Element 310 may represent, for example, the total capacity as reported to the host or other user of the pool. The total physical capacity 302 may denote the total physical storage capacity of the pool. The oversubscribed capacity 304 may denote the amount of total usable or logical capacity 310 that exceeds the physical storage capacity 302 of the pool. Element 312 may denote the current total allocation or amount of the physical capacity currently allocated/assigned to the LUNs provisioned from the pool. Line 316 denotes the total allocation amount depicted by 312. Line 314 may denote the total physical capacity depicted by 302. Element 318 may denote the amount of physical storage capacity remaining in the pool before the pool's physical storage capacity is completely consumed.

When an application writes data for the first time to a particular location in a file system built on thin LUNs (e.g., having its storage provided by thin LUNs such as file system 220a-b of FIG. 2), space is allocated from the pool providing the backing physical storage for the thin LUNs. For example, with reference back to FIG. 2, when an application writes data to file system 1 220a, physical storage is allocated from the underlying physical storage pool 2 206b and the file system 1 220a grows. When data is deleted from the file system 1 220a, storage previously allocated may stay with the file system 1 220a. Such storage may be marked for overwrite or reuse, for example, where writing new data to the file system 1 220a may reuse such storage. Some embodiments may have a space reclamation process where such previously allocated storage currently marked for reuse may be returned as free storage blocks to the pool 206b.

Figure 4:
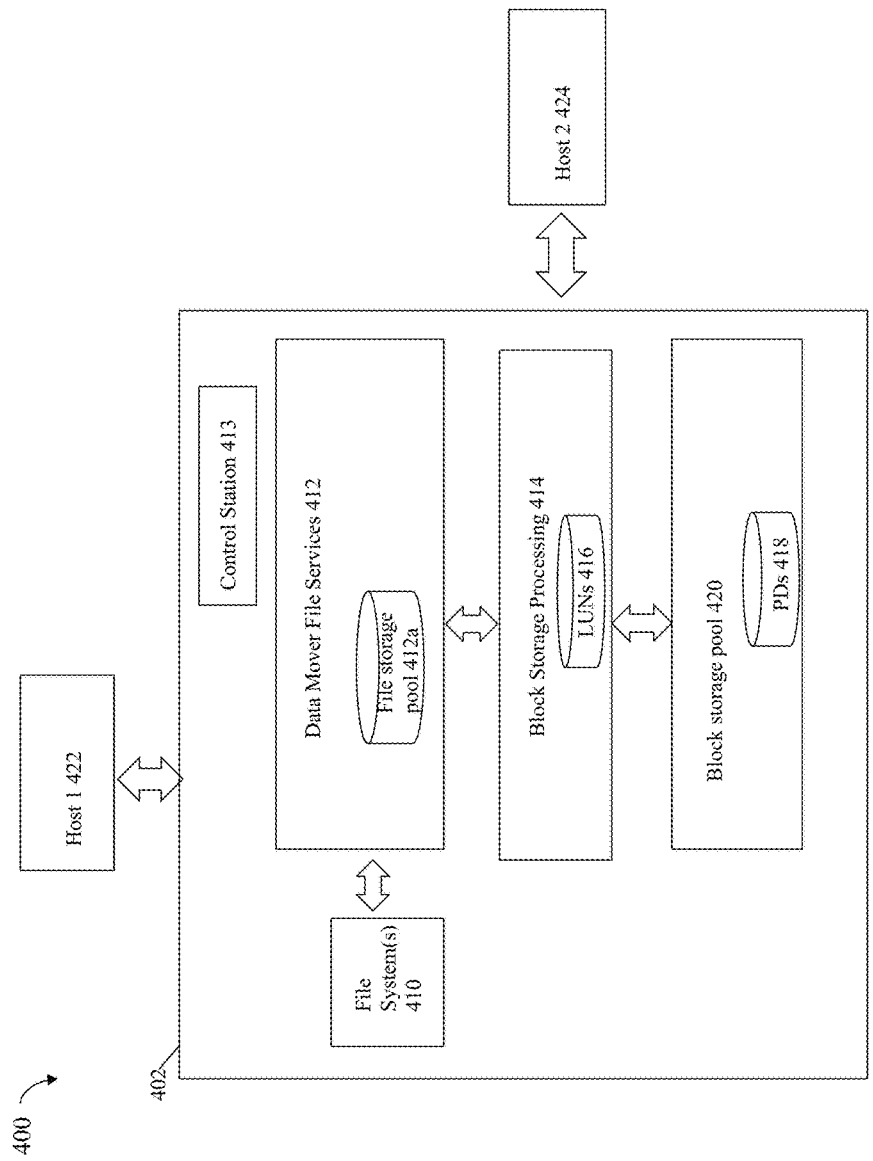

Referring to FIG. 4, shown is an example illustrating components that may be included in one embodiment in accordance with techniques herein. The example 400 includes hosts 422 and 424 and data storage system 402. An embodiment of the data storage system 402 may include control station 413, data mover file services (e.g., also referred to herein as simply "data mover") 412, block storage processing 414 and a block storage pool 420. Host 422 may communicate with data mover file services 412 to issue file system requests or operations whereby the data mover file services 412 may perform processing to implement one or more file systems 410 (e.g., see also 220a-b of FIG. 2). The one or more file systems 410 may have storage provisioned from a file storage pool 412a formed from, or built on, the LUNs 416 (e.g., see also 214a-n of FIG. 2) implemented by the block storage processing 414. The LUNs 416 of the block storage processing 414 may have physical storage provisioned from block storage pool 420 of physical storage devices (e.g., see also 206a-b of FIG. 2). Thus, storage pool 420 may be further characterized as a block storage pool providing physical storage for block-based logical devices or LUNs 416, such as thin LUNs. In at least one embodiment, the LUNs 416 of block storage processing may include thin LUNs and may also include thick LUNs where both such types of thin and thick LUNs may have physical storage provisioned from PDs 418 of the same block storage pool 420. The file storage pool 412a may be characterized as a further representation or mapping of the underlying physical storage of block storage pool 420 used for file systems 410. Thus, element 412a maps to some or all physical storage of block storage pool 420 of the PDs 418 (e.g., at the lower block storage pool or physical level).

In at least one embodiment, a component of the data storage system, such as a component performing automatic volume management (AVM) may create and manage file volumes automatically. The file volumes may represent further logical storage entities which are organized into one or more file storage pools, such as 412a, from which storage may be allocated for use by file systems, such as 410.

The control station 413 may be a server and perform various tasks in connection with file system and data storage system management. For example, the control station may provide an interface used in connection with viewing information regarding existing file systems, performing operations such as mounting or unmounting existing file systems, and the like. Some processing that may be performed by the control station is described in more detail elsewhere herein.

In at least one embodiment, the data storage system 402 may provide both file and block-based storage system interfaces for use by clients. For example, as noted above, host 1 422 may be a client of a file system implemented on the data storage system 402 and may therefore communicate file system requests to the data mover file services 412. Host 2 424 may be a client of the data storage system 402 and may therefore communicate with the block-based services provided by the block storage processing layer 414. Thus, in one embodiment, at least some of the LUNs 416 may be configured for files and consumed by the data mover file services 412 for implementing file systems 410. Additionally, at least some of the LUNs 416 may be accessed directly as block-based storage devices by host 2 424 which communicates with the block storage processing 414.

It should be noted that only a single data mover file services 412 is shown in the example 400. More generally, an embodiment of the data storage system may include any suitable number of data mover file services (e.g. one or more data movers providing file services).

It should be noted that file systems may generally be implemented using thick LUNs or thin LUNs. Generally, thick LUNs provide higher performance than thin LUNs due to the additional management overhead with thin LUNs. However, in an embodiment in accordance with techniques herein, thin LUNs may be used to provide more efficient allocation and use of physical storage. For example, with a thick LUN, all physical storage for the LUN is allocated with the LUN is created. If all such physical storage is not used by the thick LUN, such physical storage is not otherwise available for use in connection with other LUNs and such physical storage may be allocated for the thick LUN but may remain unused. An embodiment in accordance with techniques herein may use thin LUNs in connection with providing storage to file systems to thereby provide for more efficient use of the underlying physical storage allocation.

In at least one embodiment, the data mover file services 412 may not be aware of the particular LUN type of thick or thin upon with the file systems 410 are built. In such a case, the data mover file services 412 and file systems 410 may treat the total usable or logical capacity of the underlying LUNs in the same way as denoting available physical storage for storing file system data. However, a problem may occur when the underlying pool upon which the file systems 410 are built is full or has nearly all of its physical storage capacity consumed. When the pool (providing physical storage for thin LUNs upon which the one or more file systems 410 are built) becomes completely consumed, or nearly so, whereby there is little or no available physical storage remaining in the pool, problems may occur in connection with the file system. For example, a write I/O failure may occur in connection with a write operation to write data to a file of the file system built using thin LUNs. To further illustrate, processing may be performed in connection with writing data to a file system where such processing operates as if the total usable or logical capacity of the thin LUNs (upon which the file system is built) has associated physical storage. However, when the free or unused physical storage capacity of the underlying pool nears empty, data may be lost if the file system continues to write data to the physical storage. In addition, such a write I/O would cause a "rolling panic" by the data mover file services 412 where, for example, there is continuing attempts to remount affected file systems of the storage pool experiencing the empty or low free capacity. Such processing to continually remount affected file systems or perform other recovery processing may consume a lot of system resources and therefore adversely impact other file systems.

Described in following paragraphs are techniques that may be performed in an embodiment to monitor and detect the physical storage capacity consumed to prevent problems, such as noted above. For example use of techniques described in following paragraphs prevent possible data loss such as in connection with the above-mentioned writes to a file system built using thin LUNs and may also prevent a "rolling panic" by the data mover file services 412.

Figure 5:
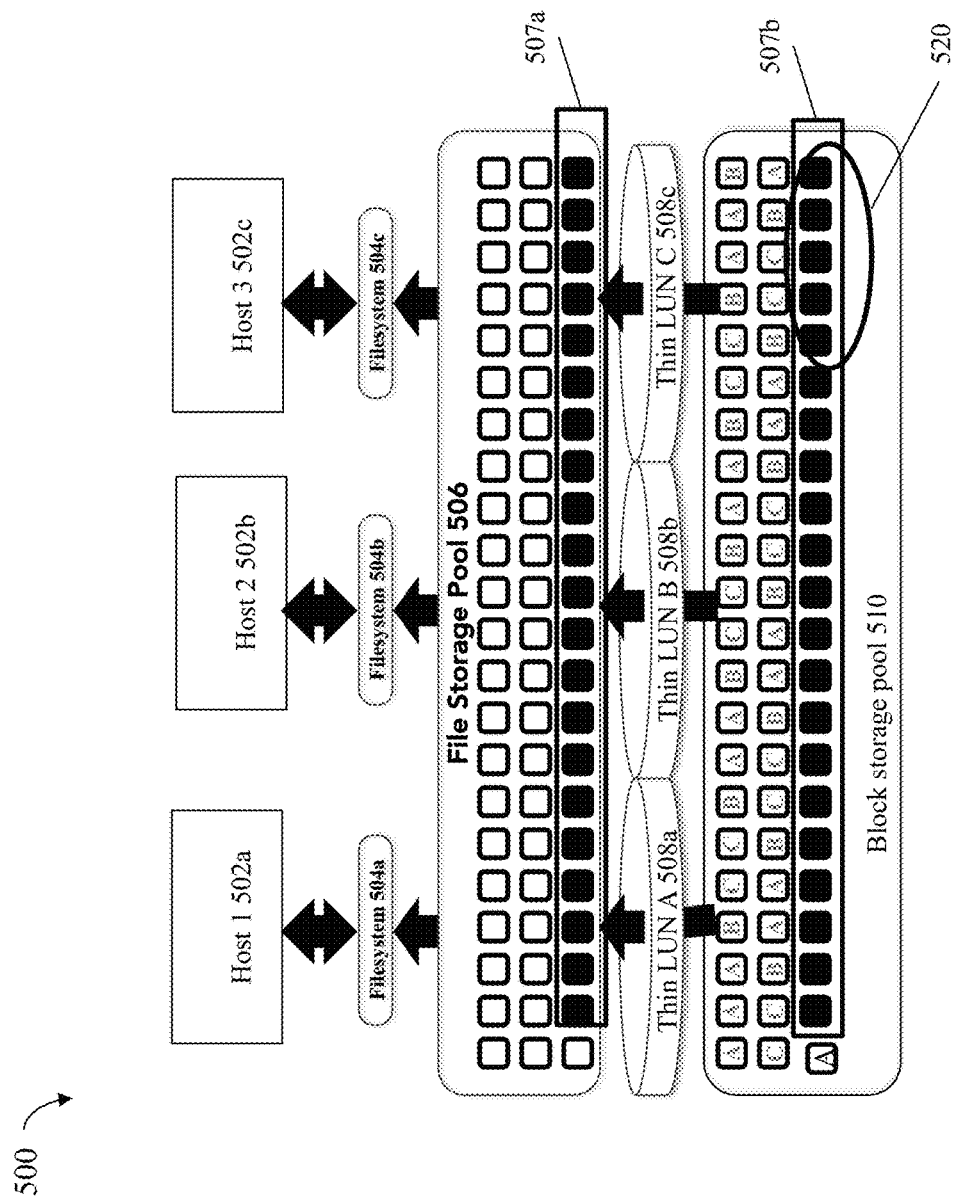

Referring to FIG. 5, shown is an example 500 illustrating in more detail components that may be included in an embodiment in accordance with techniques herein. The example 500 illustrates hosts 502a-c which, respectively, use file systems 504a-c having their storage allocation from a file storage pool 506. The file storage pool 506 may represent the pool of storage from which storage is provisioned for the files system 504a-c. The file storage pool 506 is actually implemented as a set of thin LUNs 508a-c having their storage provisioned from PDs of block storage pool 510. It should be noted that the various blocks in 510 labeled A, B and C denote the physical storage blocks allocated, respectively, for thin LUNs 508a-c (e.g., blocks labeled are allocated to thin LUN 508a). Element 507a may denote the portion of free blocks of the file storage pool 506 which are further represented as free blocks in the underlying block storage pool 510 of PDs providing provisioned storage for the LUNs 508a-c. The free blocks as denoted by 507b may be used for additional LUNs configured for file use (e.g., use in the file storage pool 506 and consumed by the data mover file services 412 of FIG. 4 as described elsewhere herein) and/or block usage in connection with thick or thin LUNs (e.g., used by block storage processing 414 of FIG. 4 and other hosts such as host 424 of FIG. 4 which access such LUNs directly as block-based devices).

As additional storage is needed for any of file systems 504a-c, storage may be accordingly provisioned from free blocks 507a of the file storage pool 506 which results in allocation of free blocks from 507b of the block storage pool 510 of PDs for thin LUNs 508a-c.

It should be noted that hosts 502a-c are similar to host 422 of FIG. 4, file systems 504a-c are similar to file systems 410 of FIG. 4, file storage pool 506 is similar to 412a of FIG. 4, thin LUNS 508a-c are similar to LUNs 416 of FIG. 4, and block storage pool 510 is similar to block storage pool 420 of FIG. 4.

In accordance with techniques herein, an embodiment may define a low space threshold specifying an amount of reserved free space within the block storage pool 510 for fulfilling or servicing incoming I/Os (e.g., such as may be directed to the file systems 504a-c). The size or amount of the reserved free space denoted by the low space threshold may be, for example, dynamically calculated based on total memory of the configuration of the data storage system. Calculation of the low space threshold, and thus the size of the reserved free space, is described in more detail in following paragraphs. Element 520 may denote the size or amount of the reserved free space where the foregoing size or amount is defined as the low space threshold in an embodiment in accordance with techniques herein.

As described elsewhere herein, with thin LUNs, the user has the ability to create LUNs with total usable capacities exceeding the physical capacity of an underlying block storage pool. If the block storage pool is oversubscribed, there is potential for the block storage pool to become full or completely consumed. An embodiment in accordance with techniques herein may use alerts to warn the user a block storage pool is becoming full such as when the current amount of free space in the pool is equal to the low space threshold. Furthermore, an embodiment in accordance with techniques herein may perform additional processing in connection with low space handling performed responsive to detecting the amount of free space in the pool reaching the low space threshold. It should be noted that low space handling will take action in connection with file systems, or more generally, file-based resources utilizing thin LUNs from a block storage pool reaching the low space threshold. Responsive to the low space condition or event being triggered in the underlying block pool, all file systems having storage allocated or hosted from that particular pool are remounted as read-only (RO) to prevent further writes and possible data loss or data unavailability. In at least one embodiment, the control station may perform processing to generate an alert to the user when the low space threshold for the block storage pool is reached (where the pool provides storage for file-based resources) and the control station may also remount the foregoing file systems as RO as part of the low space handling performed responsive to an occurrence of a low space threshold event for a block storage pool providing storage for such file systems.

It should be noted that no block-only resources are affected by the low space handling. For example, with reference again to FIG. 5, if another thin LUN D is provisioned from the block storage pool 510 and LUN D is used for only block storage access and does not provide storage for any file resources, LUN D is not affected (e.g., no action is performed as part of low space handling in connection with LUN D). Additionally, an embodiment may also perform other processing in connection with low space handling besides remounting affected file systems as RO. For example, as part of low space handling, the control station may perform processing to suspend any replication sessions for the affected file systems. (e.g., affected by the low space event or condition and associated handling performed in an embodiment in accordance with techniques herein).

As noted above, one component to low space handling is the low space threshold. In at least one embodiment, the low space threshold may be a value in GBs which defines when action should be taking on the file resources to protect them from the underlying storage pool becoming full. A low space threshold value may be specified for each individual block storage pool. However, a specified low space threshold may only be applicable to pools from which thin LUNs are configured where such thin LUNs provide physical storage for file systems, or more generally file-based resources. In at least one embodiment, the low space threshold for a block storage pool may be configuration-specific, and directly related to the total amount memory configured and used across all data movers (e.g., one or more data mover file system components) on the data storage system.

When a block storage pool's free capacity is less than the low space threshold, and thin LUNs configured from the pool provide storage to file-based resources such as file systems 405a-c of FIG. 5, an error message may be logged on the system. A component, such as the control system and/or data mover file services, receives this alert and determines if action needs to be taken. All Read/Write (R/W) file systems created on the affected storage pool (e.g., having the low space condition or event) are then remounted RO. Additionally, any R/W checkpoints of the affected file systems (having storage provisioned from the affected block storage pool) are also remounted as RO. If the affected file systems also have active replication sessions, the sessions are stopped/suspended and left in a restartable state.

To clear a low space event or condition, processing may be performed to increase the free capacity of the affected block storage pool (e.g., such that the free capacity exceeds the specified low space threshold for the pool). Free capacity of the pool may be increased in any suitable way. For example, additional drives or PDs may be added to the affected block storage pool. Processing to increase free capacity of the affected pool may also include any of deleting and/or migrating existing block LUNs from the affected pool (e.g., where such LUNs may be used to provide block-only storage and not used to provide storage for file-based resources), deleting other logical entities configured from the affected pool (e.g., deleting snapshots of LUNs, file systems, and the like consuming storage of the affected pool), and the like. Once there is sufficient free capacity within the affected block storage pool, the low space condition is cleared and the user may then restore access to the affected file systems, checkpoints, replication sessions, automatic space reclamation processing, and the like. In connection with space reclamation processing, it should be noted that only space consumed by deleted data before the low space event occurrence may be reclaimed since the affected file systems will be RO. Additionally, space reclamation processing may not free a sufficient amount of storage to clear the low space event condition whereby one or more additional steps may also be taking to further increase the free capacity of the affected pool.

Once the low space condition has been cleared, the affected file systems may be remounted as R/W, or more generally, restored back to their previous R/W or other original state prior to the low space event occurrence for the pool. If an affected file system is the source to a replication session, the session may be automatically restarted. If an affected file system is a destination image of a replication session, the user may manually restart the replication session from the source system.

In at least one embodiment in accordance with techniques herein, the low space threshold may be based on the number of data movers installed on the data storage system and the total main memory installed for each such data mover. In one embodiment, the same amount of main memory may be installed or allocated for use by each data mover in the system. In such an embodiment, the low space threshold may be determined as the number of data movers multiplied by the amount of main memory of one data mover (assuming each data mover has this same amount). More generally, the low space threshold may be expressed as the total amount of main memory used by or across all data movers configured in the data storage system. It should be noted that this total amount of main memory represents the maximum amount of buffered file data (across all data movers) stored in the main memory that may possibly be flushed to disk or other physical storage devices of the affected pool. Thus, the reserved amount of storage denoted by the low space threshold is the foregoing maximum amount of buffered file data (e.g., buffered I/O data such as write I/O data) that may be flushed from memory to the storage pool since such flushing of buffered file system data may be performed as part of remounting the affected file systems as RO in connection with low space handling as described herein. The affected file systems may first be unmounted and then remounted as RO where prior to unmounting, any/all buffered file write data is first flushed from memory to physical storage of the underlying pool providing storage for the affected file systems(s).

To further illustrate where each data mover is configured to have the same amount of main memory for usage, a data storage system may be configured to have 8 data movers and each data mover may be configured to have 24 GB of main memory. In this case, the low space threshold for each block storage pool may be 8*24 GB=192 GB. An embodiment may dynamically recalculate and modify the low space thresholds for the block storage pools as data movers may be added or removed from a data storage system configuration.

In one embodiment, once the low space condition or event has been cleared, the affected file systems that were mounted RO may now once again be mounted as R/W, or more generally, remounted and restored back to their original state prior to the low space event occurrence. An embodiment may use any suitable process (e.g., manual and/or automatic as embodied in software or code executed) to restore the affected file systems from the RO to R/W status. Such processing may include restoring mount points for the affected file systems from RO to R/W as may be performed manually by a user. Such restoration of the file systems may include remounting the file systems and associated mount points as R/W. Such restoration may be performed, for example, manually by a user issuing one or more commands via a command line interface (CLI), graphical user interface (GUI), or other suitable interface that may exist in an embodiment.

Figure 6A:
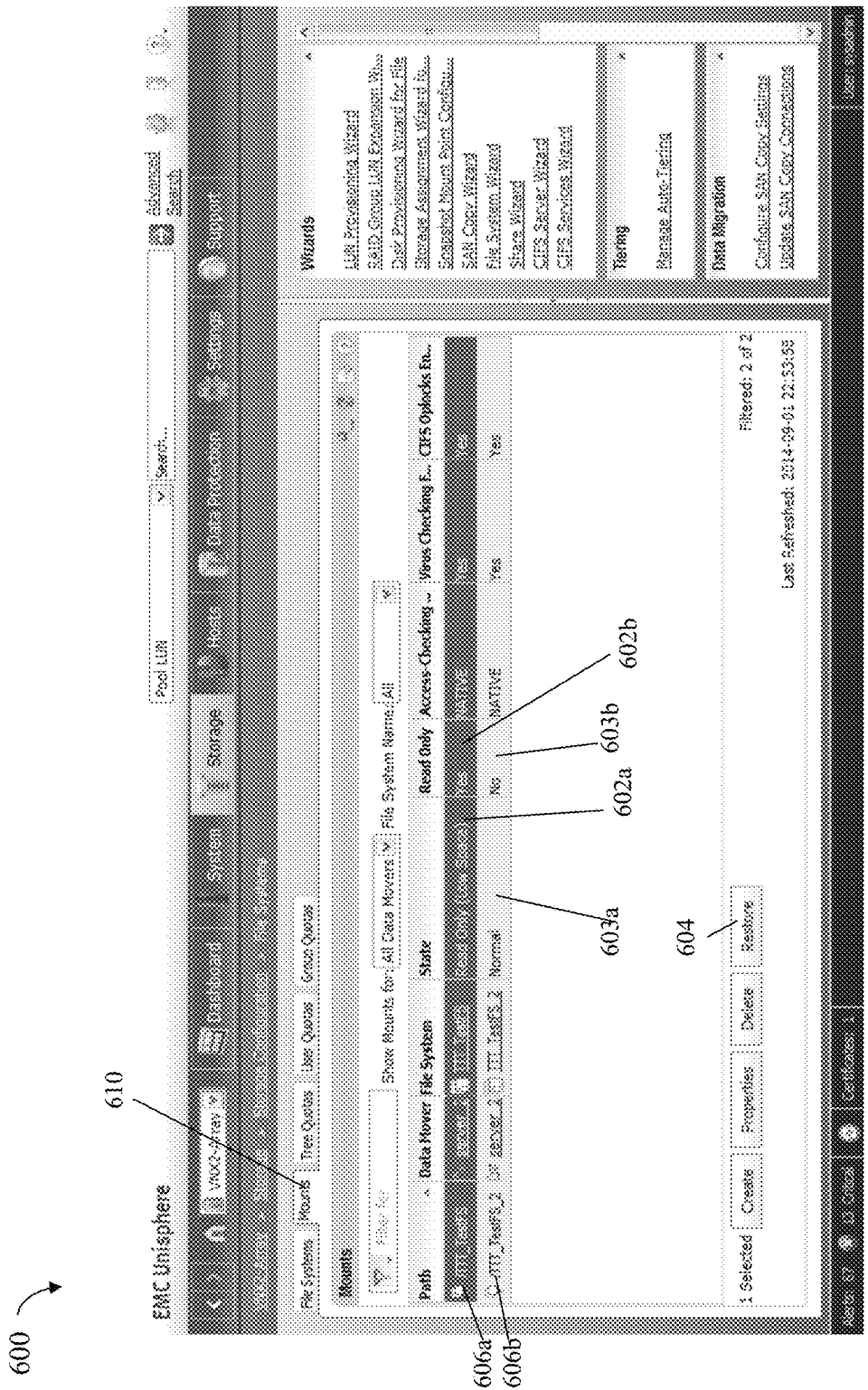
Figure 6B:
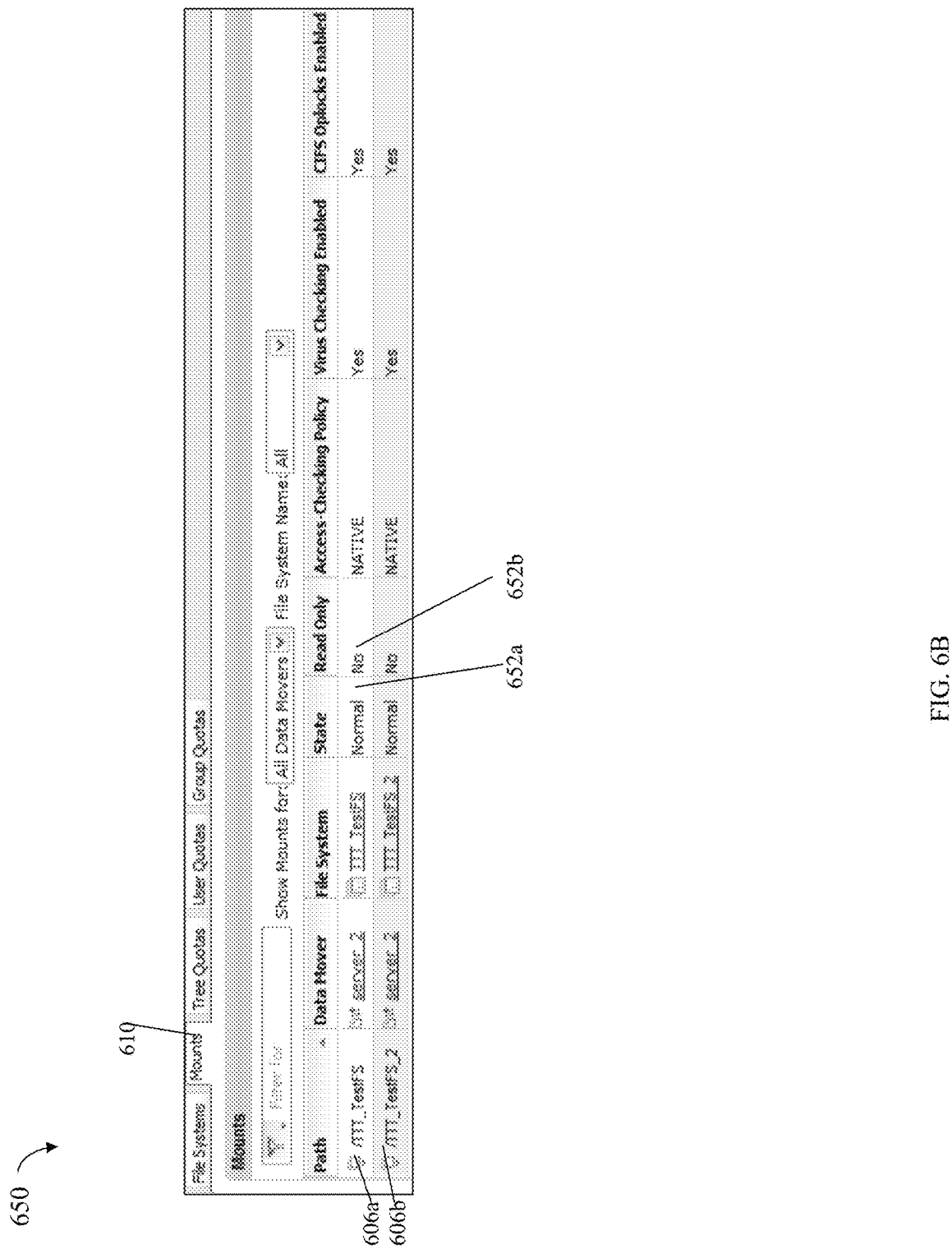

For example, with reference to FIGS. 6A and 6B, shown are examples of GUI displays that may be used in connection with restoring access to the affected file systems by restoring file system mount point to have R/W access.

Referring to FIG. 6A, shown is an example 600 of a GUI that may be displayed in an embodiment in accordance with techniques herein. The example 600 includes a mounts tab 610 which a user may select to view the mounted file systems. In the example 600, it can be seen that there are 2 file systems with row 606*a* denoting information for a first file system affected by a low space event occurrence and handling performed, and row 606*b* denoting information for a second file system not affected by the low space event occurrence and handling performed. Row 606*a* includes a state of "read only-(low space)" in entry 602*a* denoting the occurrence of the low space condition affecting the first file system represented by row 606*a*. Row 606*a* also includes entry 602*b* indicating that the first file system is mounted RO as a result of the low space event handling performed as described herein. In contrast, row 606*b* includes a state of normal in entry 603*a* denoting that the occurrence of the low space condition did not affect the second file system represented by row 606*b*. Row 606*b* also includes entry 603*b* indicating that the second file system is mounted R/W (not RO) and has not been remounted as RO as a result of the low space event handling performed as described herein.

Thus, in the example 600, a user may see the mount point for first file system represented by row 606*a* with the state of read only-low space in entry 602*a* after low space event handling performed as described herein. The user may then restore a selected file system, such as the foregoing first file system, to its previous R/W state. With reference to the example 600, a user may select row 606*a* (e.g., representing the first file system affected by the low space event occurrence and associated handling performed as described herein) and then select the restore button 604 to restore the first file system to its RW state.

In response to selecting row 606*a* and button 604, the GUI of FIG. 6B may be displayed. The example 650 may be displayed, for example, over or on top of the view presented in FIG. 6A. The example 650 provides an updated portion of the screen associated with the mounts tab 610. Note that in this example 650, entries 606*a* and 606*b* are as in connection with the example 600 with the difference that entries 652*a* and 652*b* have been updated from, respectively, 602*a* and 602*b* as in FIG. 6A. Entry 652*a* indicates that the affected first file system has its state returned to normal (e.g., low space event state/condition cleared) and entry 652*b* indicates that the affected first file system is no longer mounted RO and is rather now mounted as R/W.

Another condition that may occur is an out of space (OOS) condition occurrence where the block storage pool, such as 510, runs out of space (e.g., no remaining free capacity). An OOS condition occurrence may be characterized as an "edge" or extreme case where the control system has not completed remounting all affected file systems as RO (as part of low space handling) and then runs out of free capacity in the affected pool prior to completing low space handling for all affected file systems using the affected pool. An OOS condition may occur due to an extreme I/O load where the free capacity of the affected pool has continued to be consumed until all free capacity is zero. For example, the free capacity of the affected pool may have reached the low space threshold and low space handling may not have been performed for a first of the file systems for which write I/Os continue to be received where storage is further allocated from the affected pool for such writes until the low space handling has remounted the first file system as RO. As a result, when there is an attempt to flush all the buffered file data for the first file system to storage of the affected pool, the affected pool may run out of free capacity thereby triggering the OOS condition. As another example, the free capacity of the affected pool may continue to be consumed by allocations made for other thin LUNs where such other thin LUNs may not be used in provisioning storage for the affected pool (e.g., the other thin LUNs may be used by a host directly as block storage devices and writes may be issued by the host to the other thin LUNs for which storage is provisioned from the affected pool causing the pool to reach an OOS condition).

Thus, the OOS condition may occur, for example, when the block storage pool is fully consumed and low space handling as described herein (which remounts affected file systems as RO) has not yet been completed for all affected file systems. In such a case where a write is received by a data mover for a file system built on thin LUNs having storage provisioned from the block storage pool and the data mover needs to allocate additional storage for the new write data but there is no free capacity in the block storage pool providing the storage for the thin LUNs, the write operation fails. When an OOS condition/event occurs, an alert may be sent to the user providing notification of the OOS condition/event. At this point, OOS handling is performed responsive to the occurrence of the OOS condition/event. As part of OOS handling, the data mover fails over to another second standby data mover which takes over control and unmounts the affected file systems and their snapshots. However, access is maintained to file systems and other resources not affected by the OOS condition as described below in more detail. For example, file systems having storage provisioned from thin LUNs of other block storage pools (not having the OOS condition) continue to operate normally. As another example, other LUNs, such as thick LUNs, provisioned from the affected pool having the OOS condition may continue to be accessed normally (e.g., read and write I/O operations may continue to be processed for the thick LUNs without being affected by the OOS condition). However, another thin LUN (e.g., one of LUNS 416 of FIG. 4) that provides block storage directly to a host (e.g., host 424) may be affected in connection with attempts to perform write operations resulting in requested for additional storage allocations from the affected pool.

The second standby data mover may also perform other additional processing responsive to the OOS condition as part of OOS handling depending on what data services or facilities are supported in a particular embodiment. For example, the second data mover may stop any replication sessions for affected file systems, may stop sessions with replication checkpoints utilizing space from the affected storage, and the like. After all affected file systems and snapshots have been unmounted and replication and other sessions stopped where needed, the data mover (which failed over) is allowed to reboot normally and restore access to the unaffected file systems, unaffected snapshots and unaffected replication sessions as handled by the data mover prior to fail over.

As described elsewhere herein in connection with low space handling, the user must increase the free capacity of the affected block storage pool having the OOS condition before restoring access to the affected file systems and other resources having storage provisioned from the OOS block storage pool. In particular, the free capacity of the OOS block storage pool must be increased and exceed the low space threshold for the restore to occur. Once sufficient free capacity exists in the affected block storage pool, the user may utilize the restore operation to restore access to the affected resources. During the restore operation, access to affected file systems and snapshots is restored. However, the data mover (which failed over) is rebooted before replication sessions that were affected by the OOS condition are able to be restarted. In one embodiment, a failback command may be issued from the standby second data mover where the failback causes the original failed data mover to reboot and restart. Subsequently, any halted replication sessions (as performed as part of OOS handling by the second data mover) may be restarted. In at least one embodiment, if an affected file system is a destination image of a replication session, the user may manually restart the replication session from the source system.

Figure 7A:
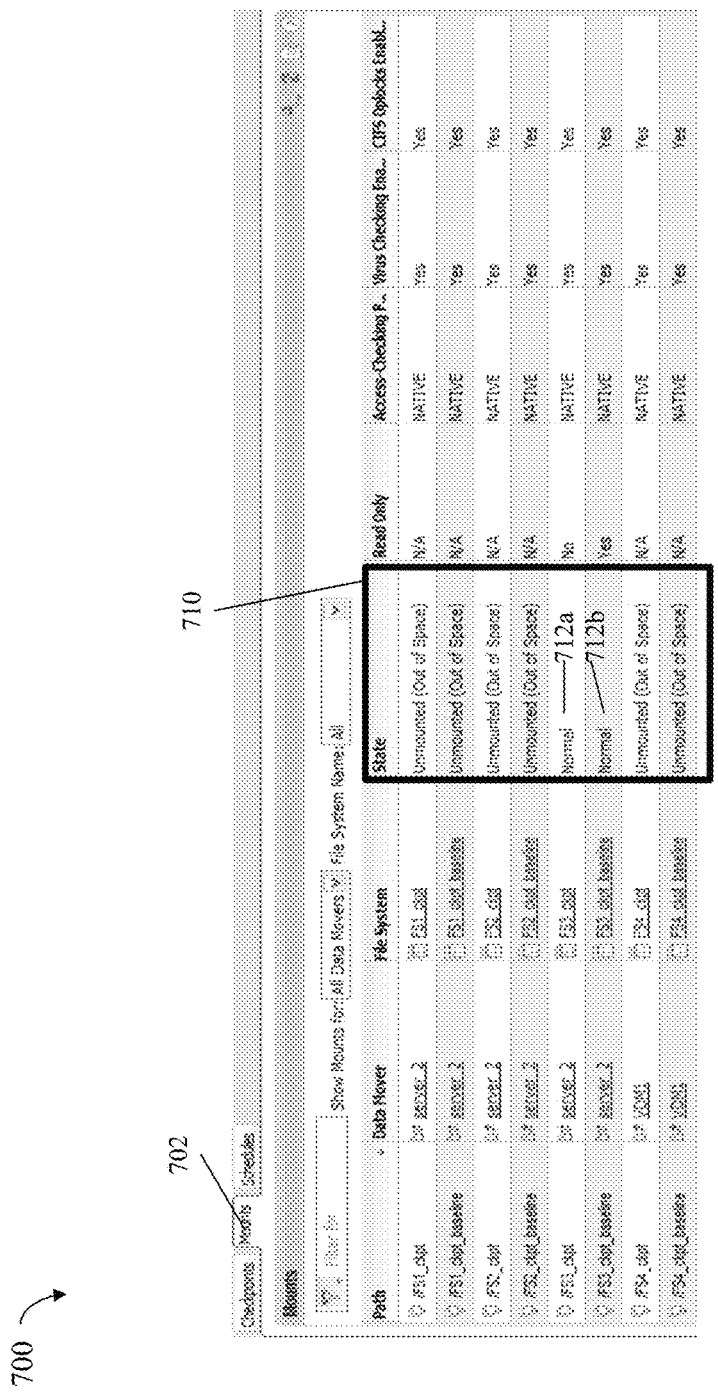

Referring to FIG. 7A, shown is a first GUI that may be displayed illustrating results of an occurrence of an OOS condition/event and associated handling performed responsive to the OOS condition/event in an embodiment in accordance with techniques herein. The example 700 includes a mounts tab 702 that may be selected to view the mounted state/status of existing file systems. The example 700 may be displayed responsive to selecting mounts tab 702 after there has been an occurrence of an OOS condition for a block storage pool providing storage for thin LUNs of affected file systems and after processing is performed as described above in connection with handling the OOS condition where the affected file systems are unmounted. As indicated by 710, the state of all 8 file systems is illustrated with those 6 file systems affected by the OOS condition of a block storage pool having a state of "unmounted (out of space)". The remaining 2 file systems that are unaffected by the OOS condition are denoted by having associated normal states 712a-b. In this example, those 6 file system having the state of "unmounted (out of space)" in 710 may have storage provisioned from one or more thin LUNs from the block storage pool having the OOS condition. The remaining 2 file systems that are unaffected by the OOS condition (e.g., having associated normal states 712a-b) may have storage provisioned from one or more thin LUNs from a second block storage pool that does not have an occurrence of an OOS condition and also does not have an occurrence of a low space condition.

As described above in connection with the low space event or condition, a user must clear the event or condition by increasing the affected block pool's free capacity to clear the low space flag. As with the low space event or condition, the free capacity must exceed the low space threshold for the block pool. Any of the same techniques described above in connection with increasing free capacity of the affected block pool upon the occurrence of a low space event or condition may also be used in connection with increasing free capacity in connection with an OOS event or condition.

Figure 7B:

Referring to FIG. 7B, shown is an example of second GUI that may be displayed in an embodiment in accordance with techniques herein after the user has taken steps to increase the free capacity of the affected block pool having the OOS condition in order to clear the OOS condition and also the low space condition. The example 720 illustrated information that may be displayed in connection with block storage pool 1 (element 721) which is the affected pool having the OOS and low space conditions. As illustrated by 722, the free physical capacity of the affected pool, which is block storage pool 1, has been increased to about 47% or 1134.461 GB of storage which is more than the specified low space threshold for the pool.

Figure 7C:

Referring to FIG. 7C, shown is an example of a third GUI that may be displayed in an embodiment in accordance with techniques herein. The example 740 may be displayed following the second GUI 720 of FIG. 7B after the user has sufficiently increased the free capacity of the affected block storage pool to clear the low space condition. At this point, the user may select, for restoration, one or more unmounted file systems previously included in FIG. 7A. The example GUI 740 is similar to the example GUI 720 with the addition of the restore button 744 in the GUI 740.

First, the user may select one or more unmounted file systems. In this example, the user selects two file systems represented by rows 742a-b and then selects the restore button 744 to restore the foregoing selected two file systems to their state as prior to the OOS condition or event occurrence.

Figure 7D:
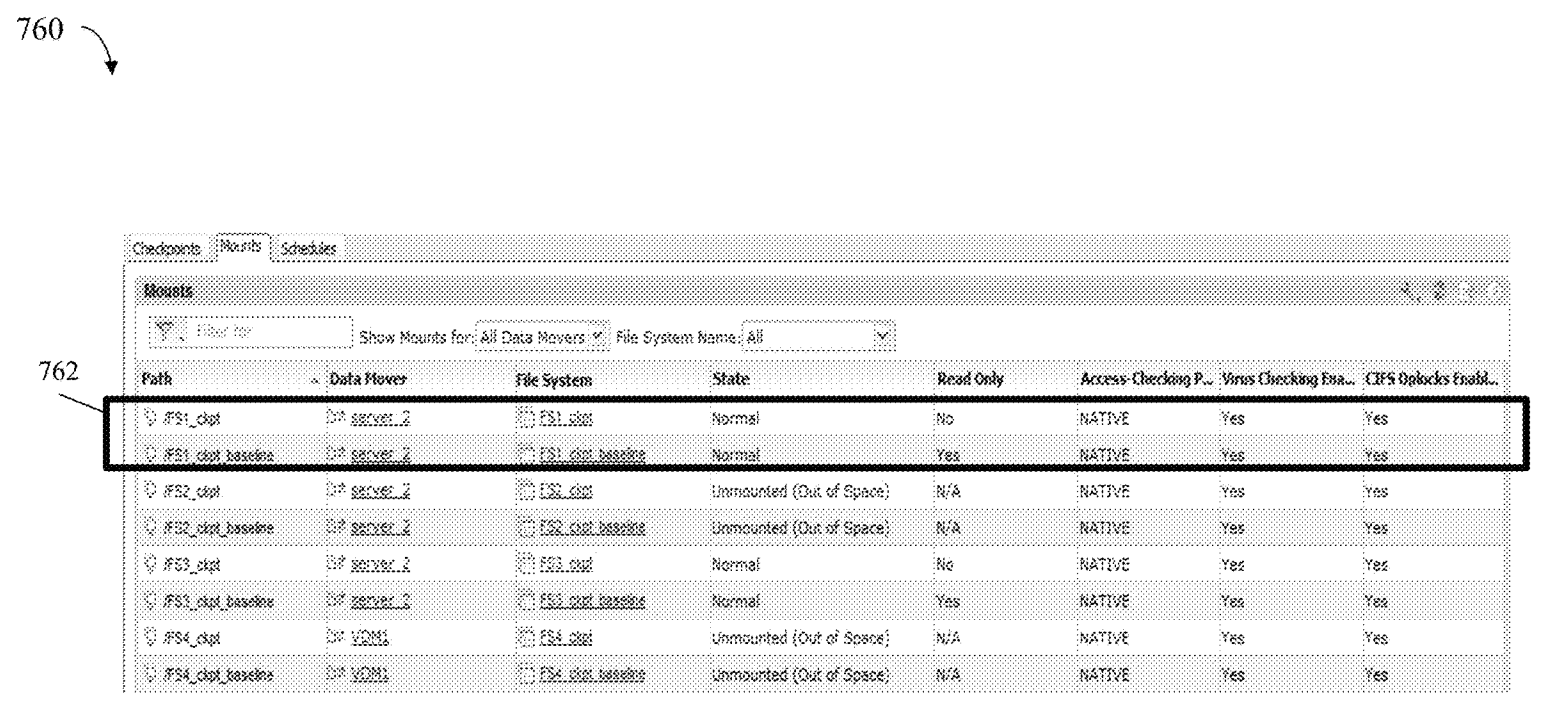

Responsive to selecting restore button 744, the GUI 760 of FIG. 7D may be displayed. In the example 760, note that element 762 denotes that the state of the two selected file systems has been restored to normal.

As described above, an embodiment in accordance with techniques herein may use thin LUNs configured from a block storage pool to provide physical storage for file systems. Use of such thin LUNs from which to allocate storage for file systems provides for efficient use of physical storage of the block storage pool. The embodiment in accordance with techniques herein provides for low space handling in response to the occurrence of a low space condition or event for the block storage pool providing provisioned storage for the thin LUNs upon which the file systems are built (e.g., allocated storage). The embodiment in accordance with techniques herein similarly provides for OOS handling in response to the occurrence of an OOS event or condition for the block storage pool providing provisioned storage for the thin LUNs upon which the file systems are built (e.g., allocated storage). Thus, the low space handling and OOS handling provide protection for the file systems to prevent data loss and/or data unavailability. As also described above, an embodiment in accordance with techniques herein may provide improved techniques for low space threshold determination whereby the low space threshold may be dynamically calculated based on the total memory of the configuration as used by the particular number of one or more data movers configured in a data storage system. Responsive to any change in the number of data movers, the low threshold associated may be accordingly dynamically recalculated. In one embodiment in accordance with techniques herein where each data mover is configured to use the same amount of main memory, the low threshold may be determined by multiplying the number of data movers in the configuration by the amount of main memory configured or used by each data mover.

What will now be described in connection with FIGS. 8-11 are flowcharts of processing steps that may be performed in an embodiment in accordance with techniques herein. FIGS. 8-11 summarize processing described above.

Figure 8:
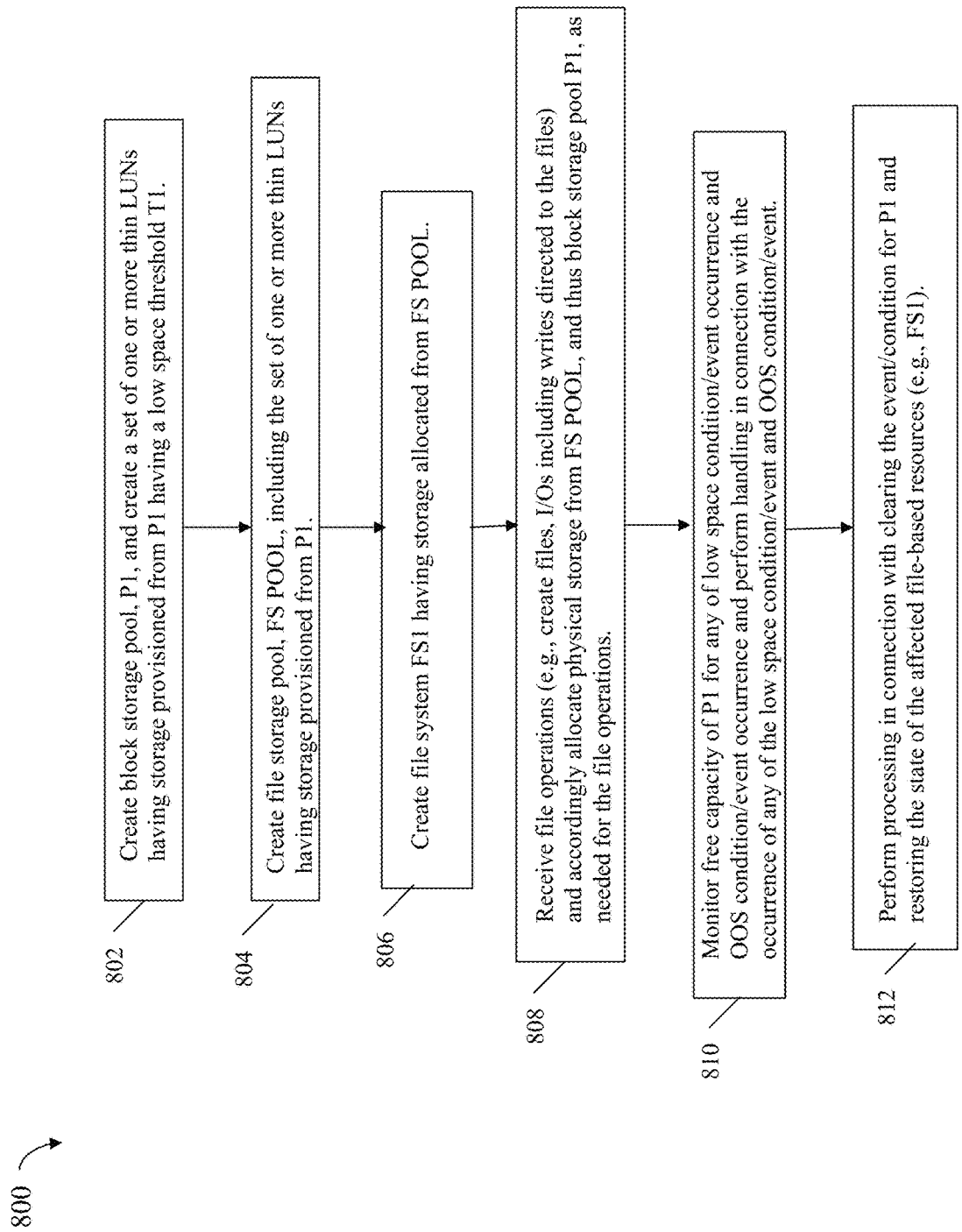
FIGS. 8, 9, 10 and 11 are flowcharts of processing steps that may be performed in an embodiment in accordance with techniques herein.

Referring to FIG. 8, shown is a first flowchart 800 of processing steps that may be performed in an embodiment in accordance with techniques herein. At step 802, a block storage pool, P1 may be created. Additionally, in step 802, a set of one or more LUNs having storage provisioned from P1 may be created where P1 has a low space threshold T1. At step 804, a file storage pool, FS POOL, is created that includes the set of one or more thin LUNs having storage provisioned from P1. As discussed above, in one embodiment, a component may configure one or more file volumes from the thin LUNs of P1 where the file volumes form FS POOL denoting storage used for hosting one or more file systems. At step 806, file system FS1 is created having storage allocated from/hosted on FS POOL. At step 808, file operations (e.g., create files, I/Os including writes directed to the files) may be received whereby physical storage is accordingly allocate from FS POOL, and thus block storage pool P1, as needed for the file operations. At step 810, the free capacity of P1 is monitored for any of low space condition/event occurrence and OOS condition/event occurrence. Step 810 may also include perform handling in response to the occurrence of any of the low space condition/ event and OOS condition/event. At step 812, processing is performed in connection with clearing the event/condition for PA and restoring the state of the file affected file-based resources, such as FS1, having their storage provisioned from the affected block storage pool, P1 (experiencing the low space and/or OOS condition/event in step 810).

Figure 9:
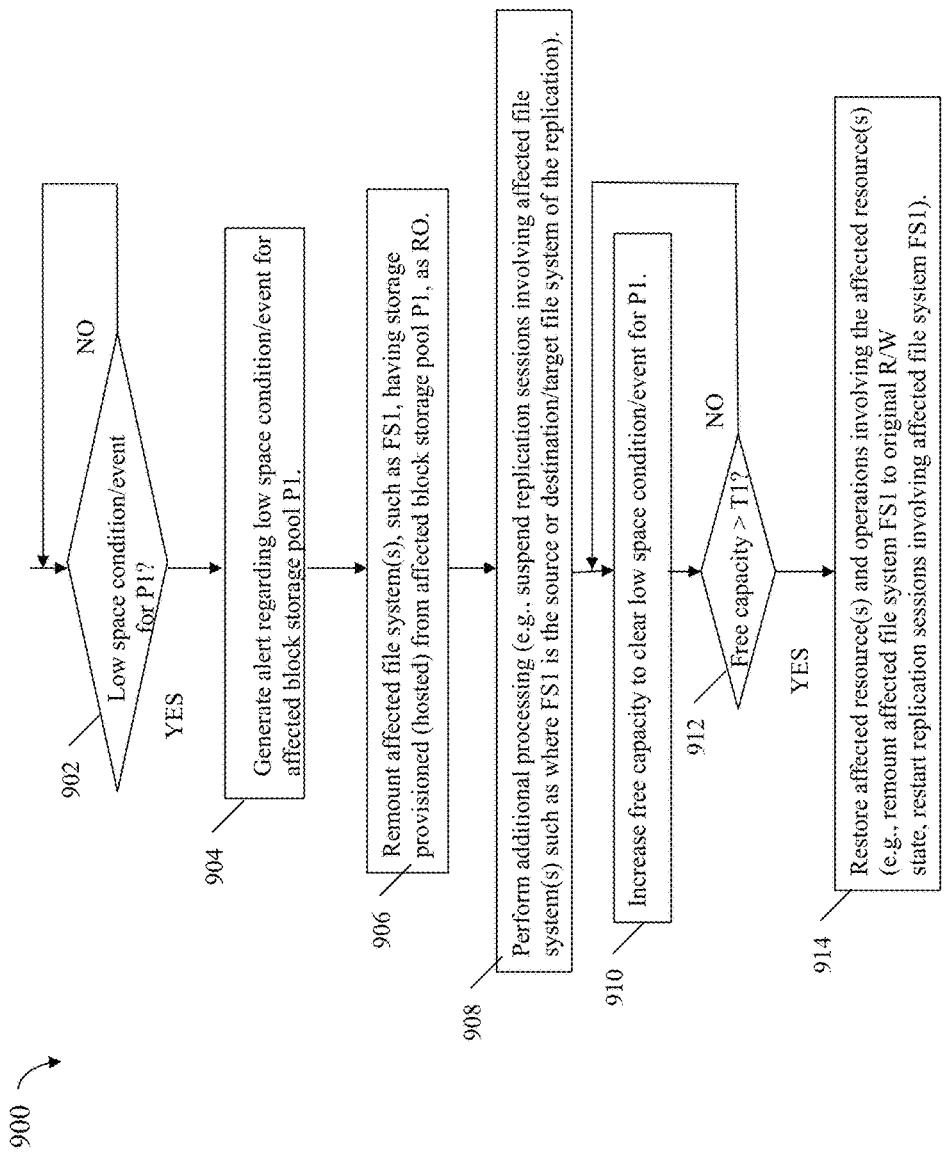

Referring to FIG. 9, shown is a second flowchart of processing steps that may be performed in an embodiment in accordance with techniques herein. The flowchart 900 outlines processing steps that may be performed in connection with a low space condition/event and may be generally included in low space handling performed responsive to the occurrence of a low space condition/event. At step 902, a determination is made as to whether there is a low space condition/event for block storage pool P1. Control remains at step 902 until step 902 evaluates to yes and then control proceeds to step 904. At step 904, an alert may be generated for the user regarding the low space condition/event for the affected block storage pool P1. At step 906, the affected file system(s), such as FS1, having storage provisioned/hosted from the affected block storage pool P1, are remounted as RO. At step 908, additional processing may be performed. Step 908 may include, for example, suspending replication sessions involving affected file system(s) such as where FS1 is the source or destination/target file system of the replication. At step 910, processing may be performed, such as by a user, to increase the free capacity in P1 and thus attempt to clear the low space condition/event for P1. Examples of how free capacity of P1 may be increased are described elsewhere herein. At step 912, a determination is made as to whether the free capacity for P1 is greater than the low space threshold T1. If step 912 evaluates to no, control proceeds to step 910. If step 912 evaluates to yes, control proceeds to step 914. It should be noted that if step 912 evaluates to yes, the low space condition/event is cleared for the block storage pool P1. At step 914, processing may be performed to restore the affected resources and also restart processing/ operations involving the affected resources. For example, step 914 may include remounting affected file system FS1 to its original R/W state as it was prior to the low space condition/event occurrence detected in step 902. Step 914 may include, for example, restarting any replication sessions previously suspended which involved the affected file system FS1.

Figure 10:
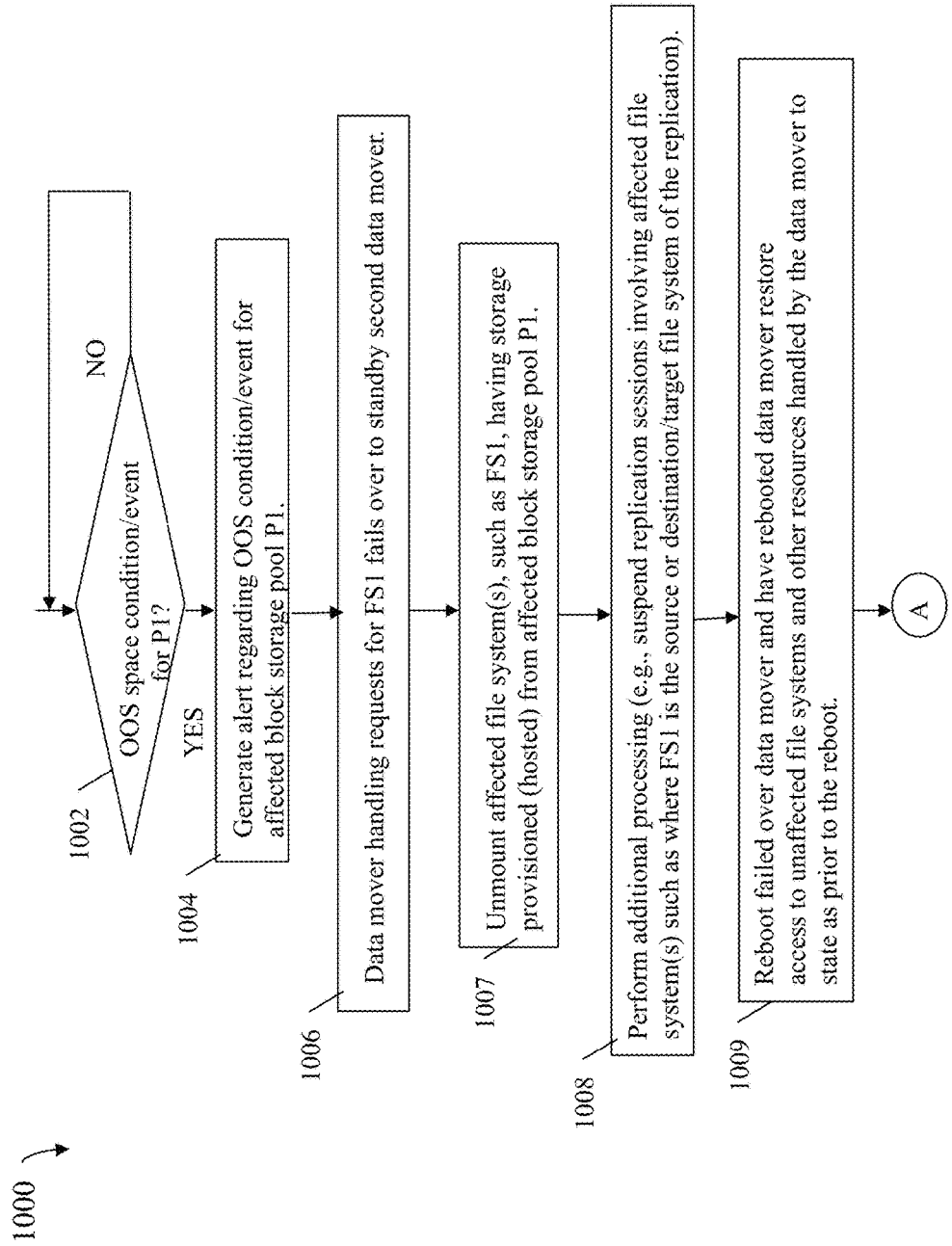
Figure 11:
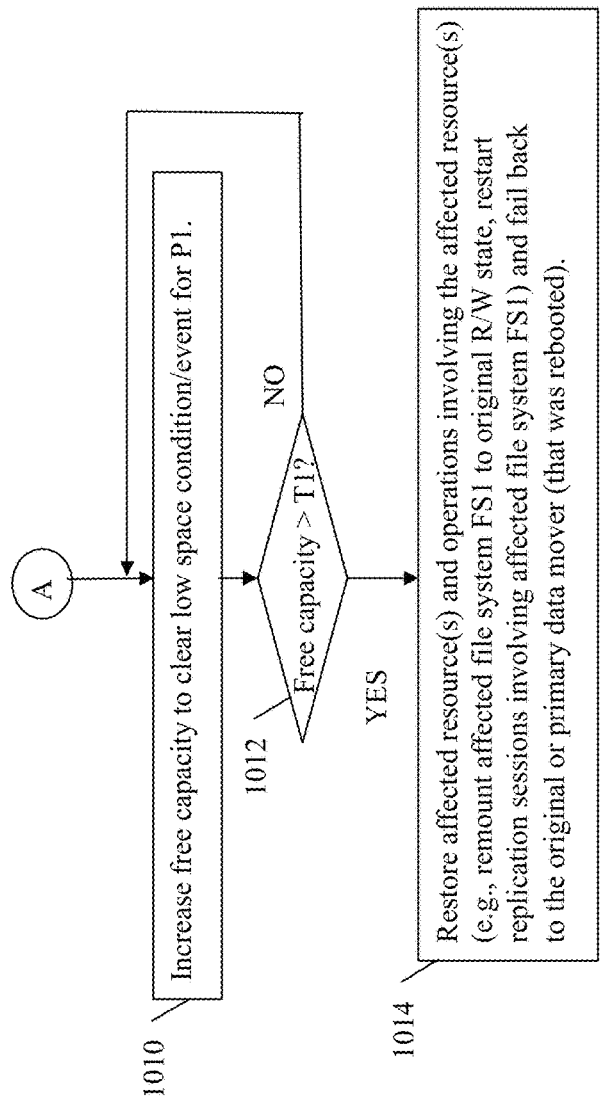

Referring to FIGS. 10 and 11, shown is a third flowchart of processing steps that may be performed in an embodiment in accordance with techniques herein. The flowchart 1000 outlines processing steps that may be performed in connection with a OOS condition/event and may be generally included in OOS handling performed responsive to the occurrence of an OOS condition/event. At step 1002, a determination is made as to whether there is an OOS condition/event for block storage pool P1. Control remains at step 1002 until step 1002 evaluates to yes and then control proceeds to step 1004. At step 1004, an alert may be generated for the user regarding the OOS condition/event for the affected block storage pool P1. At step 1006, the data mover handling requests for FS1 fails over to a standby second data mover. At step 1007, the affected file system(s), such as FS1, having storage provisioned/hosted from the affected block storage pool P1, are unmounted. At step 1008, additional processing may be performed. Step 1008 processing is similar to step 908 processing as described in connection with FIG. 9. At step 1009, the data mover that failed over to the second data mover is rebooted. Also, as part of step 1009, the rebooted data mover restores access to unaffected file systems and other resources handled by the data mover to their states as prior to the reboot. From step 1009, control proceeds to perform steps 1010, 1012 and 1014, which are respectively similar to steps 910, 912 and 914 of FIG. 9 with the difference that once the free capacity is increased to be greater than zero, the OOS condition/event for P1 may be additionally cleared, and also with the difference that step 1014 includes failing back to the original of primary data mover (e.g., that was rebooted) in order for the original data mover to resume performing processing and handling of file operations and requests from clients.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing capacity-related event occurrences comprising:
   determining a first occurrence of a low threshold event for a first storage pool, wherein the low threshold event occurs when an amount of free storage in the first storage pool is less than a threshold, wherein a set of one or more virtually provisioned logical devices has physical storage provisioned from the first storage pool and physical storage for a file system is provisioned from the set of one or more virtually provisioned logical devices; and
   performing first processing responsive to determining the first occurrence of the low threshold event for the first storage pool, the first processing including performing processing that protects the file system, wherein the first processing includes performing processing to handle the first occurrence of the low space event for the first storage pool, the first processing including remounting the file system as read only, wherein after said remounting, the file system is read only and still has its physical storage provisioned from the first storage pool that experienced the first occurrence of the low threshold event.

2. The method of claim 1, wherein the first processing includes generating an alert regarding the low space event for the first storage pool.

3. The method of claim 1, wherein the first processing includes suspending any replication sessions involving the file system.

4. The method of claim 1, wherein the first processing includes:
   increasing free capacity of the first storage pool;
   determining whether current free capacity of the first storage pool is greater than a threshold denoting a minimum amount of free capacity;
   if it is determined that the current free capacity of the first storage pool is not greater than the threshold, performing processing to further increase the current free capacity of the first storage pool; and
   if it is determined that the current free capacity of the first storage pool is greater than the threshold, clearing the low space event for the first storage pool.

5. The method of claim 4, further comprising performing additional processing once the low space event for the first storage pool is cleared, the additional processing including:
   restoring the file system to its original state prior to the remounting of the file system as read-only.

6. The method of claim 1, further comprising:
   determining a second occurrence of an out of space event for the first storage pool; and
   performing second processing responsive to determining the occurrence of the out of space event for the first storage pool, the second processing including performing processing that protects the file system.

7. The method of claim 6, wherein the second processing includes performing processing to handle the second occurrence of the out of space event for the first storage pool, the second processing including unmounting the file system.

8. The method of claim 7, wherein the first occurrence denoting an occurrence of the low space event occurs prior to the second occurrence, and wherein the second processing includes generating an alert regarding the second occurrence of the out of space event for the first storage pool.

9. The method of claim 8, wherein the second processing includes:
   increasing free capacity of the first storage pool;
   determining whether current free capacity of the first storage pool is greater than a threshold denoting a minimum amount of free capacity;
   if it is determined that the current free capacity of the first storage pool is not greater than the threshold, performing processing to further increase the current free capacity of the first storage pool; and
   if it is determined that the current free capacity of the first storage pool is greater than the threshold, clearing the out of space event for the first storage pool.

10. The method of claim 9, further comprising performing additional processing once the out of space event for the first storage pool is cleared, the additional processing including:
    restoring the file system to its original state prior to the unmounting of the file system.

11. The method of claim 7, wherein the second processing includes suspending any replication sessions involving the file system.

12. The method of claim 6, wherein there is an occurrence of the out of space event when free capacity of the first storage pool reaches zero.

13. The method of claim 1, wherein a second set of one or more other logical devices have storage provisioned from the first storage pool, and the method includes:
    receiving an I/O operation directed to a first logical device in the second set, said I/O operation being a block-based I/O operation to perform any of read and write to a location on the first logical device.

14. The method of claim 13, wherein the first logical device is a virtually provisioned logical storage device.

15. A system comprising:
    a processor; and
    a memory comprising code stored therein that, when executed, performs a method of processing capacity-related event occurrences comprising:
      determining a first occurrence of a low threshold event for a first storage pool, wherein the low threshold event occurs when an amount of free storage in the first storage pool is less than a threshold, wherein a set of one or more virtually provisioned logical devices has physical storage provisioned from the first storage pool and physical storage for a file system is provisioned from the set of one or more virtually provisioned logical devices; and
      performing first processing responsive to determining the first occurrence of the low threshold event for the first storage pool, the first processing including performing processing that protects the file system, wherein the first processing includes performing processing to handle the first occurrence of the low space event for the first storage pool, the first processing including remounting the file system as read only, wherein after said remounting, the file system is read only and still has its physical storage provisioned from the first storage pool that experienced the first occurrence of the low threshold event.

16. A computer readable medium comprising code stored thereon that, when executed, performs method of processing capacity-related event occurrences comprising:
    determining a first occurrence of a low threshold event for a first storage pool, wherein the low threshold event occurs when an amount of free storage in the first storage pool is less than a threshold, wherein a set of one or more virtually provisioned logical devices has physical storage provisioned from the first storage pool and physical storage for a file system is provisioned from the set of one or more virtually provisioned logical devices; and
    performing first processing responsive to determining the first occurrence of the low threshold event for the first storage pool, the first processing including performing processing that protects the file system, wherein the first processing includes performing processing to handle the first occurrence of the low space event for the first storage pool, the first processing including remounting the file system as read only, wherein after said remounting, the file system is read only and still has its physical storage provisioned from the first storage pool that experienced the first occurrence of the low threshold event.

* * * * *